United States Patent
Alles et al.

[19]

[11] Patent Number: 6,047,814
[45] Date of Patent: Apr. 11, 2000

[54] METHOD FOR MONITORING A CONVEYOR BELT AND SYSTEM THEREFOR

[75] Inventors: Rainer Alles, Isernhagen; Thorsten Wach, Wunstorf, both of Germany

[73] Assignee: ContTechTrasnsportbandsysteme GmbH, Hannover, Germany

[21] Appl. No.: 08/962,302

[22] Filed: Oct. 31, 1997

[30] Foreign Application Priority Data

Oct. 31, 1996 [DE] Germany ............................ 196 43 997

[51] Int. Cl.⁷ .......................... B65G 43/00; B65G 47/10
[52] U.S. Cl. ................................... 198/810.02; 198/502.1
[58] Field of Search .............................. 198/502.1, 502.4, 198/572, 810.02, 810.03, 810.04

[56] References Cited

U.S. PATENT DOCUMENTS

| | | | |
|---|---|---|---|
| 4,020,945 | 5/1977 | Takeno et al. | 198/502 |
| 4,372,172 | 2/1983 | Gombocz et al. | 73/862.39 X |
| 4,464,654 | 8/1984 | Klein | 340/676 X |
| 4,587,852 | 5/1986 | Butler et al. | 73/826 X |
| 5,168,266 | 12/1992 | Fukuda | 340/676 |
| 5,441,158 | 8/1995 | Skinner | 209/583 X |

FOREIGN PATENT DOCUMENTS

| | | |
|---|---|---|
| 0274803 | 1/1990 | German Dem. Rep. . |
| 4111358 | 10/1992 | Germany . |
| 4435842 | 4/1996 | Germany . |
| 4444264 | 4/1996 | Germany . |
| 196 03 578 | 8/1997 | Germany . |

*Primary Examiner*—William E. Terrell
*Assistant Examiner*—K W Bower
*Attorney, Agent, or Firm*—Walter Ottesen

[57] ABSTRACT

The invention relates to a method for monitoring a continuous revolving conveyor belt (4) having a connecting region (8). The connecting region (8) is monitored with the aid of two transponders (12) and (14). One of the transponders is arranged forward of the connecting region (8) and the other transponder is connected rearward of the connecting region (8). Both transponders (12) and (14) transmit respective signals to an external transmitter/receiver unit 16 wherein a conclusion is drawn as to the spacing of the two transponders (12) and (14) on the basis of the time-dependent spacing of the two signals. If the spacing s of the transponders (12) and (14) exceeds a pregiven amount, then a conclusion is drawn by the external transmitter/receiver unit (16) as to a critical change in length of the connecting region (8) and corresponding measures are initiated.

10 Claims, 1 Drawing Sheet

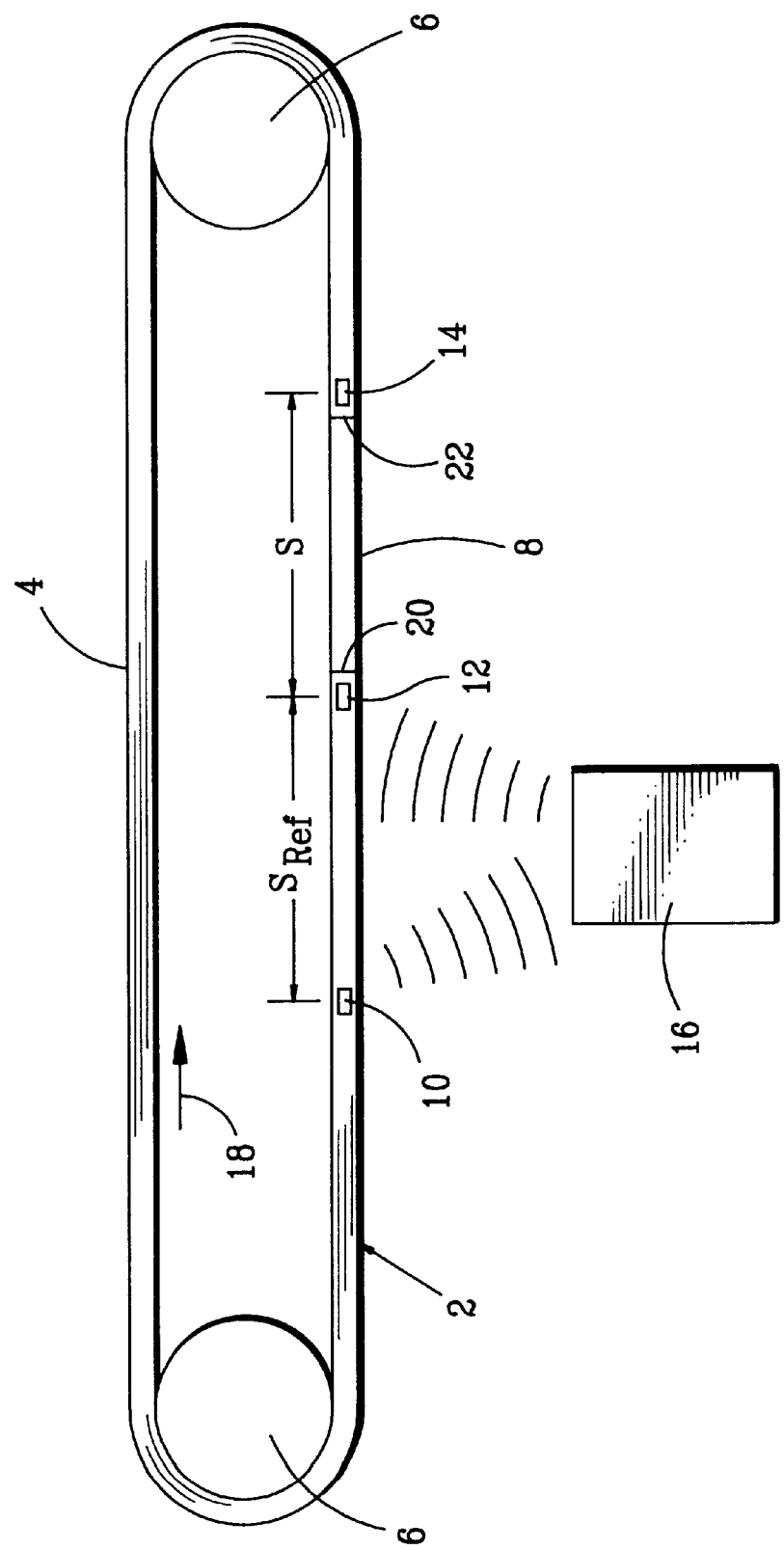

6,047,814

METHOD FOR MONITORING A CONVEYOR BELT AND SYSTEM THEREFOR

FIELD OF THE INVENTION

The invention relates to a method for monitoring a continuous moving belt having a connecting region. The invention relates especially to a method for monitoring a conveyor belt having a connecting region whose start and whose end assume a desired distance $s_{des}$ in the unloaded, undamaged state. At least one transponder is disposed in or on the belt. The transponder transmits a signal to an external transmitter/receiver unit when passing through an operating region of the external transmitter/receiver unit. The invention also relates to a system for carrying out the method.

BACKGROUND OF THE INVENTION

In the following, the transponder is characterized as an integrated circuit which is conductively connected to a coil. Transponders of this kind are known and are surrounded by a body to protect against mechanical loads.

Conveyor belts are used in conveyor belt installations and are often several hundred meters long. In daily use, the conveyor belts can be subjected to high mechanical loads and especially to high tension forces. For this reason, tension reinforcement is introduced into conveyor belts subjected to high loads. This tension reinforcement can, for example, comprise high-strength steel cords which are embedded in a special rubber. It is likewise known to configure the tension reinforcement in the form of multi-layered textile inserts. With the tension reinforcement, the mechanical loads to which the conveyor belt can be subjected, can be significantly increased; however, it cannot be precluded that damage can occur to the conveyor belt because of a load which is too high. Especially the connecting region, in which the ends of the conveyor belt are connected to each other, remains a weak location. For this reason, it has already been suggested to check conveyor belts and especially their connecting regions on a regular basis for signs of loosening.

In view of the above, and as disclosed, for example, in German patent application 196 03 578, at least one transponder is introduced into the connecting region of a conveyor belt which transmits a signal to an external transmitter/receiver unit in a first functionally operable state when passing through the operative area of this transmitter/receiver unit. The transponder transfers into a second functionally inoperable state when a critical change in form of the connecting region takes place on the conveyor belt as a result of mechanical tension loads which are too high so that the transponder can no longer transmit a signal to the external transmitter/receiver unit. The absence of the signal is an indication to the external transmitter/receiver unit that a critical change in form is present in the connecting region of the conveyor belt and appropriate control measures are initiated which reduce the tension load in the connecting region of the conveyor belt. This can, for example, be achieved by reducing the load on the conveyor belt. In an extreme case, the conveyor belt can be brought to standstill by the external transmitter/receiver unit.

With the method disclosed in German patent application 196 03 578, critical changes in form of the connecting region of the conveyor belt can be reliably and satisfactorily monitored. However, this method is based on an irreversible destruction of the transponder introduced into the connecting region. For this reason, the method can, after a critical change in form of the connecting region is exceeded, only be carried out again after the destroyed transponder is replaced by a functionally operational transponder. A replacement of this kind introduces costs which are then unnecessary when only changes in length of the connecting region are indicated by the transponder which do not lead directly to damage of the connecting region and therefore to the conveyor belt.

SUMMARY OF THE INVENTION

It is an object of the invention to provide a method for monitoring a belt having a connecting region (especially a conveyor belt having a connecting region) whereby a change in length of the connecting region of the belt is reliably indicated without the transponder in the conveyor belt being destroyed. It is also an object of the invention to provide a system for carrying out the method of the invention.

The method of the invention is for monitoring a continuous revolving belt. The belt includes a connecting section having a start and an end delimiting the length of the section viewed in the direction of movement of the belt. The start and the end assuming a pregiven desired distance $s_{des}$ therebetween measured along the section when the belt is in an unloaded, undamaged state. The method includes the steps of: providing at least one start transponder mounted in or on the belt at the start of the connecting section and at least one end transponder mounted in or on the belt at the end of the connecting section; providing an external transmitter/receiver unit having an operative region wherein signals from the transponders can be received thereby; transmitting a first signal from the start transponder to the external transmitter/receiver unit at time point $t_0$ when the start transponder passes through the operative region; transmitting a second signal from the end transponder to the external transmitter/receiver unit at time point $t_1$ when the end transponder passes through the operative region; determining a time interval $dt_{act}=t_1-t_0$ in the external transmitter/receiver unit; and, determining whether a critical change in length of the connecting section has occurred based on the time span $dt_{act}$.

The basic idea of the invention is seen in that the length of the connecting region of the conveyor belt is monitored with the aid of at least two transponders. These transponders assume a pregiven desired spacing with respect to each other in the undamaged state of the conveyor belt. Preferably, at least one transponder is mounted directly forward of or directly rearward of the connecting region viewed in the direction of movement of the conveyor belt so that the desired spacing between the two transponders corresponds to the length of the connecting region in the undamaged state of the conveyor belt. With the aid of these transponders, the desired spacing $s_{des}$ can then be set in a trial runthrough for an undamaged connecting region and can be stored in the external transmitter/receiver unit.

For belts which are driven at a pregiven speed which is precisely maintained, a determination can be made as to whether a change in length has taken place already based alone on the time span $dt_{act}$. A desired time span $dt_{des}$ is pregiven by the pregiven speed (v) in which time span the external transmitter/receiver unit must have received signals for an undamaged connecting region. Appropriate measures are initiated when there is a deviation of the measured actual time span from the pregiven desired time span over a pregiven amount. If, in contrast, the speed of the belt is not preset, then this quantity or a further quantity must be determined from which the speed can be derived. The actual spacing $s_{act}=v dt_{act}$ can be computed from the product of the speed (v) and the actual time span $dt_{act}$ and be compared in the external transmitter/receiver unit to the stored desired spacing $s_{des}$. In this case too, measures are initiated when the actual spacing deviates in excess of a pregiven amount from the desired spacing.

The speed of the belt can, for example, be measured with an rpm sensor on a drum or support roller of the belt because the rpm of a drum or a support roller is proportional to the speed of the belt.

The advantages obtained with the invention are especially seen in that critical changes in length of the connecting region of the conveyor belt can be reliably determined without a transponder being destroyed. In this way, the method can be repeated with the same transponders and even when a critical change in length had previously occurred. A further advantage of the invention is seen in that the transponders can be mounted in direct proximity of the connecting region and their functional operability can therefore also be ensured when very high mechanical loads act upon the conveyor belt which become manifest almost exclusively in the connecting region of the conveyor belt.

Furthermore, a large spacing between the transponders is ensured with this arrangement so that the method of measurement can be carried out with adequate accuracy. Alternatively, it is also possible to mount the transponders within the connecting region in direct proximity to the start or to the end of the connecting region. This affords the advantage that the transponders can be simply introduced into the connecting region already when the connection is manufactured.

According to a preferred embodiment of the invention, several transponders are mounted at the start and at the end of the connecting region. For example, it is purposeful to position a transponder at the left and at the right edge of the belt at the start and at the end of the connecting region in order to make a comparison as to whether the length of the connection changes differently. With such an arrangement of the transponders, a precise determination can be made as to whether the connection of the belt ends begins to loosen first at only one end and, in this cases early measures can be initiated.

According to another embodiment of the method of the invention, at least two transponders are mounted in the belt at a known almost unchangeable spacing $s_{ref}$ to each other. With the aid of these transponders, the method of the invention can be carried out for belts which are not driven at a pregiven speed. In this embodiment of the method, the following method steps are carried out: providing an additional transponder in or on the belt in spaced relationship to one of the start transponder and the end transponder so as to cause the additional transponder and the one transponder to conjointly define a virtually unchangeable distance $s_{ref}$ therebetween; transmitting an additional signal from the additional transponder to the external transmitter/receiver unit at a time point $t_2$ when the additional transponder passes through the operative region; transmitting a signal from the one transponder to the external transmitter/receiver unit at time point $t_3$ when the one transponder passes through the operative region; computing the time span $dt'=t_3-t_2$ in the external transmitter/receiver unit and, from the time span $dt'$, computing the speed $v=s_{ref}/dt'$ of the belt; computing the product of the time span $dt_{act}$ and the speed v to obtain the actual distance $s_{act}=vdt_{act}$ between the start transponder and the end transponder; and, initiating measures when the actual distance $s_{act}$ differs from the pregiven desired distance $s_{des}$ by more than a pregiven amount ds.

The advantage of this embodiment of the invention is seen in that changes in length occur in the belt as well as in the connecting region under normal operational loads; whereas, critical changes start exclusively in the connecting region. For this reason, it is possible to mount two transponders in the belt wherein the spacing between these two transponders changes in dependence upon alternating tension loads but, the spacing remains in an almost constant relationship with respect to changes in length in the connecting region and only deviates significantly therefrom for critical changes.

For example, two transponders can be mounted at a spacing $s_{ref}$ outside of the connecting region in the belt. Alternatively, it is possible to mount only one transponder outside of the connecting region at the reference spacing $s_{ref}$ to the transponder at the start or at the end of the connecting region so that the belt contains only three transponders in the simplest case.

According to still another feature of the invention, the time span $dt_{act}$ is set into relationship to the time span $dt'$. The following applies when no change in length is present in the connecting region:

$$dt_{act}/dt'=s_{des}/s_{ref}.$$

During operation of the conveyor belt, and for a load in the connecting region, the following applies:

$$dt_{act}/dt'=s_{act}/s_{ref}.$$

Measures are initiated when the ratio $dt_{act}/dt'$ deviates from $s_{des}/s_{ref}$ by more than a pregiven amount because this is an indication that the actual spacing $s_{act}$ greatly deviates from the desired spacing $s_{des}$, that is, a critical change in length is present in the connecting region of the conveyor belt.

This embodiment affords the advantage that only the relative quantity $dt_{act}/dt'$ is determined and thereby changes in length of the connecting region, which result from the changing load conditions of the belt but are not critical, are partially eliminated with respect to their influence in that the reference spacing of the reference transponders, and therefore the time interval $dt'$, likewise changes in dependence upon the load. The ratio $dt_{act}/dt'$ deviates only then significantly from $s_{des}/s_{ref}$ when critical changes in length are present in the connecting region. Preferably, in this embodiment, the reference spacing $s_{ref}$ corresponds to the desired spacing $s_{des}$ so that the comparison quantity $S_{des}/s_{ref}$ becomes 1.

According to a further embodiment of the invention, the transponders located in the belt transmit the signal in the form of an individual identifier to the external transmitter/receiver unit. The advantage of this further embodiment is seen in that the signals outputted by the transponders can be distinguished by the external transmitter/receiver unit so that an erroneous interpretation of the signals by the external transmitter/receiver unit is precluded.

In summary, it can be stated that critical changes in length of the connecting region can be determined simply and reliably with the method and system of the invention without the transponders, which are introduced into the belt, being damaged.

BRIEF DESCRIPTION OF THE DRAWINGS

The invention will now be described with reference to the single FIGURE of the drawing which shows a schematic representation of a conveyor belt equipped with the system according to the invention.

DESCRIPTION OF THE PREFERRED
EMBODIMENTS OF THE INVENTION

The single FIGURE of the drawing shows a conveyor belt assembly 2 having a conveyor belt 4 which runs on drums 6. In the embodiment shown, it is presumed that the conveyor belt 4 is driven at a speed which is not pregiven, that is, a pregiven speed is not precisely maintained.

The connecting region or section 8 has first and second ends represented schematically by lines 20 and 22, respectively, drawn perpendicularly to the direction of movement of the belt. The two ends (20, 22) assume a desired spacing $s_{des}$ to each other in the unloaded, undamaged state. The connecting region 8 is subjected to high mechanical loads which can lead to a critical change in length of the connecting region 8. For this reason, the connecting region 8 is subjected to special monitoring. For this purpose, transponders 10, 12 and 14 are embedded in the conveyor belt 4. The two transponders 10 and 12 conjointly define a reference spacing $s_{ref}$ and the transponder 12 is mounted at the start of the connecting region 8 and the transponder 14 is mounted at the end of the connecting region 8. The direction of movement of the conveyor belt 4 is indicated by arrow 18.

Preferably, the transponders 12 and 14 are in direct proximity to the start and to the end, respectively, of the connecting region and have a spacing s with respect to each other which corresponds to the desired spacing $s_{des}$ in the unloaded, undamaged state of the connecting region 8. A change in length of the connecting region 8 can occur because of high mechanical tension loads and, as a consequence thereof, a change of spacing of the transponders 12 and 14 relative to each other. The transponders 12 and 14 can especially move away from each other. With the aid of the transponders 10, 12 and 14 introduced into the conveyor belt, the change in length of the connecting region 8 can be determined as explained below.

With the revolving movement of the conveyor belt 4, the transponder 10 first comes into the operative region of an external transmitter/receiver unit 16 and then transmits a signal at a time point $t_2$ to the unit 16. Preferably, the signal is an individual identifier. The transponder 12 comes into the operative region of the external transmitter/receiver unit 16 after the conveyor belt 4 passes through the distance $s_{ref}$. This transponder 12 likewise transmits a signal to the unit 16, but at a time point $t_3$. Preferably, this signal too is an individual identifier. After a further passthrough of the distance s of the conveyor belt 4, the transponder 14 enters the operative region of the external transmitter/receiver unit 16 whereupon this transponder also transmits a signal to the unit 16 at time point $t_1$. This signal too is preferably an individual identifier. The external transmitter/receiver unit 16 includes, for example, a microprocessor or hard-wired program to perform calculations. With the aid of the data present in the external transmitter/receiver unit 16, the following quantities can now be computed:

$dt'=t_3-t_2$ wherein $dt'$ corresponds to the time span in which the transponders 10 and 12 transmit their respective individual identifiers to the external transmitter/receiver unit 16;

$v=s_{ref}/dt'$ wherein v is the speed of the conveyor belt 4;

$dt_{act}=t_1-t_3$ wherein $dt_{act}$ is the time span in which the transponders 12 and 14 transmit their respective individual identifiers to the external transmitter/receiver unit 16;

$s_{act}=vdt_{act}=s_{ref}dt_{act}/dt'$ wherein $s_{act}$ corresponds to the actual spacing of the two transponders 12 and 14 from each other;

$dt_{act}/dt'$ wherein $dt_{act}$ and $dt'$ are as computed above; and, $ds=s_{des}-s_{act}$ wherein ds indicates the change in length of the connecting region 8 under the action of tension loads and the quantity $s_{des}$ is stored in the external transmitter/receiver unit 16 and is the length of the connecting region 8 for an unloaded, undamaged conveyor belt 4.

If now the external transmitter/receiver unit 16 determines that the ratio $dt_{act}/dt'$ deviates more than a pregiven amount from $s_{des}/s_{ref}$ (especially from 1 when $s_{des}=s_{ref}$) or the quantity ds exceeds a pregiven amount, then measures are initiated by the external transmitter/receiver unit 16 which operate to reduce the tension loads acting on the conveyor belt and therefore especially on the connecting region 8. The measures can, if required, also lead to bring the conveyor belt 4 to standstill.

It should be noted that in the embodiment shown, the two transponders 10 and 12 for determining the speed v of the conveyor belt 4 are mounted in the longitudinal direction of the conveyor belt 4 forward of the connecting region 8. It is however also possible to arrange the transponder 10 rearward of the connecting region so that the speed of the conveyor belt 4 can be measured with the aid of the transponders 14 and 10.

In the conveyor belt assembly shown, several transmitter/receiver stations can be mounted as shown. In this case, it is possible to check the connecting region 8 of the conveyor belt 4 several times during the revolving movement of the conveyor belt so that appropriate measures can be initiated immediately when there is a critical change in length of the connecting region 8.

It is understood that the foregoing description is that of the preferred embodiments of the invention and that various changes and modifications may be made thereto without departing from the spirit and scope of the invention as defined in the appended claims.

What is claimed is:

1. A method of monitoring a continuous revolving belt, said belt including a connecting section having a start and an end delimiting the length of said section viewed in the direction of movement of said belt, said start and said end assuming a pregiven desired distance $s_{des}$ therebetween measured along said section when said belt is in an unloaded, undamaged state, the method comprising the steps of:

providing at least one start transponder mounted in or on said belt at said start of said connecting section and at least one end transponder mounted in or on said belt at said end of said connecting section;

providing an external transmitter/receiver unit having an operative region wherein signals from said transponders can be received thereby;

transmitting a first signal from said start transponder to said external transmitter/receiver unit at time point $t_0$ when said start transponder passes through said operative region;

transmitting a second signal from said end transponder to said external transmitter/receiver unit at time point $t_1$ when said end transponder passes through said operative region;

determining a time interval $dt_{act}=t_1-t_0$ in said external transmitter/receiver unit; and, determining whether a critical change in length of said connecting section has occurred based on said time span $dt_{act}$.

2. The method of claim 1, comprising the further step of initiating measures based on whether a critical change in length has occurred.

3. The method of claim 1, wherein each of said transponders transmits the signal corresponding thereto in the form of an individual identifier.

4. The method of claim 1, wherein said belt is a conveyor belt.

5. The method of claim 1, comprising the further steps of:

providing an additional transponder in or on said belt in spaced relationship to one of said start transponder and said end transponder so as to cause said additional transponder and said one transponder to conjointly define a virtually unchangeable distance $s_{ref}$ therebetween;

transmitting an additional signal from said additional transponder to said external transmitter/receiver unit at a time point $t_2$ when said additional transponder passes through said operative region;

transmitting a signal from said one transponder to said external transmitter/receiver unit at time point $t_3$ when said one transponder passes through said operative region;

computing the time span $dt'=t_3-t_2$ in said external transmitter/receiver unit and, from said time span $dt'$, computing the speed $v=s_{ref}/dt'$ of said belt;

computing the product of said time span $dt_{act}$ and said speed v to obtain the actual distance $s_{act}=vdt_{act}$ between said start transponder and said end transponder; and, initiating measures when the actual distance $s_{act}$ differs from said pregiven desired distance $s_{des}$ by more than a pregiven amount ds.

6. The method of claim 5, wherein each of said transponders transmits the signal corresponding thereto in the form of an individual identifier.

7. The method of claim 1, comprising the further steps of:

providing an additional transponder in or on said belt in spaced relationship to one of said start transponder and said end transponder so as to cause said additional transponder and said one transponder to conjointly define a virtually unchangeable distance $s_{ref}$ therebetween;

transmitting an additional signal from said additional transponder to said external transmitter/receiver unit at a time point $t_2$ when said additional transponder passes through said operative region;

transmitting a signal from said one transponder to said external transmitter/receiver unit at time point $t_3$ when said one transponder passes through said operative region;

computing the time span $dt'=t_3-t_2$ in said external transmitter/receiver unit and then, also in said external transmitter/receiver unit, computing the ratio $dt_{act}/dt'$; and, initiating measures when said ratio $dt_{act}/dt'$ differs from a ratio of $s_{des}/s_{ref}$ by more than a pregiven amount.

8. The method of claim 7, wherein each of said transponders transmits the signal corresponding thereto in the form of an individual identifier.

9. A system for monitoring a continuous belt revolving in a direction of movement and including a connecting section having a start and an end delimiting the length of said connecting section viewed in the direction of movement of said belt, the system comprising:

an external transmitter/receiver unit having an operative region wherein signals can be received;

a start transponder mounted in or on said belt at said start of said section and transmitting a first signal to said external transmitter/receiver unit when passing through said operative region thereof;

an end transponder mounted in or on said belt at said end of said section and transmitting a second signal to said external transmitter/receiver unit when passing through said operative region thereof;

said external transmitter/receiver unit being programmed to compute a time span $dt_{act}$ between which said first and said second signals are received thereby; and, said external transmitter/receiver unit being programmed to compute, based on said time span $dt_{act}$, whether a critical change of length of said connecting section has occurred.

10. The system of claim 9, wherein said belt is a conveyor belt.

\* \* \* \* \*